United States Patent [19]
Myers

[11] 4,392,382
[45] Jul. 12, 1983

[54] LINEARIZED ELECTRONIC CAPACITIVE PRESSURE TRANSDUCER

[75] Inventor: Donald O. Myers, Carpentersville, Ill.

[73] Assignee: Motorola Inc., Schaumburg, Ill.

[21] Appl. No.: 241,888

[22] Filed: Mar. 9, 1981

[51] Int. Cl.³ .................. G01L 19/04; G01L 19/12
[52] U.S. Cl. .................................... 73/708; 73/766; 73/718; 73/724
[58] Field of Search ............... 73/708, 766, 765, 718, 73/724

[56] References Cited

U.S. PATENT DOCUMENTS

| | | |
|---|---|---|
| 3,703,828 | 11/1972 | Bullard, Jr. et al. |
| 3,841,150 | 10/1974 | Pearson . |
| 3,886,473 | 5/1975 | Heyck . |
| 4,000,643 | 1/1977 | Pearson ................. 73/766 |
| 4,165,653 | 8/1979 | Morehouse . |
| 4,176,557 | 12/1979 | Johnston ................ 73/708 |
| 4,178,621 | 12/1979 | Simonelic et al. |
| 4,202,218 | 5/1980 | Romo . |
| 4,204,244 | 5/1980 | Ho . |
| 4,226,125 | 10/1980 | Waugh .................. 73/708 |
| 4,227,419 | 10/1980 | Park . |
| 4,250,452 | 2/1981 | Gray et al. . |
| 4,255,632 | 3/1981 | Ho . |
| 4,289,035 | 8/1981 | Lee ....................... 73/724 |
| 4,322,977 | 4/1982 | Sell et al. ............... 73/708 |
| 4,337,665 | 7/1982 | Sato et al. .............. 73/766 |

FOREIGN PATENT DOCUMENTS 50114662  3/1977  Japan ......................................... 73/708

*Primary Examiner*—Stephen A. Kreitman
*Assistant Examiner*—David U. Carlson
*Attorney, Agent, or Firm*—James W. Gillman; James S. Pristelski; Phillip H. Melamed

[57] ABSTRACT

A capacitive pressure transducer 10 with an analog output voltage which varies linearly as a function of sensed pressure is provided. A capacitive pressure sensor $C_x$ provides a pressure variable capacitance that determines the frequency of a sensor oscillator 11. The oscillator frequency is combined with a reference frequency by a pair of D-type flip-flops 18 and 19 to provide a resultant signal having a duty cycle related to the sensed pressure. The resultant signal is integrated to provide a first analog signal as an input to a controllable gain amplifier 24 which receives gain control information from a non-linear gain control circuit 40 that receives an analog control signal as an input. The analog control signal varies as a function of sensed pressure in an opposite manner to said first analog signal. Said non-linear circuit provides for non-linearly varying the gain of amplifier 24 as a function of sensed pressure. Preferably the non-linear circuit 40 includes temperature compensating diodes 47. The output of the amplifier is a temperature compensated output signal which has a substantial linear variation as a function of sensed pressure.

12 Claims, 3 Drawing Figures

LINEARIZED ELECTRONIC CAPACITIVE PRESSURE TRANSDUCER

BACKGROUND OF THE INVENTION

The present invention generally relates to the field of pressure transducers and more specifically to the field of capacitive pressure transducers.

Capacitive pressure sensors are known and provide a variable capacitance in response to sensed pressure. Examples of such pressure sensors are illustrated in U.S. Pat. Nos. 4,178,621 to Simonelic and Ho, 4,204,244 to Ho and 4,225,632 to Ho, all assigned to the same assignee as the present invention. Typically, such capacitive sensors are utilized by processing circuits to provide an output sensor voltage, typically an analog voltage, which has a magnitude that is directly related to the sensed pressure. One example of such a processing circuit is shown in U.S. Pat. No. 4,250,452 to Gray and Pace and assigned to the same assignee as the present invention. While known processing circuits for pressure sensing devices have performed satisfactorily under most conditions, such processing circuits have not been entirely satisfactory when extremely large ranges of pressures are to be sensed since the output voltage has been found to not vary linearly as a function of sensed pressure over these extremely large ranges of pressure, especially if the magnitude of the output voltage is only permitted to vary over narrow voltage limits. Also, such processing circuits do not generally operate properly over large temperature ranges.

Some prior circuits have utilized an additional pressure variable capacitor, in addition to the main pressure variable capacitor, to attempt to provide a linearized output voltage over large ranges of sensed pressure. Providing such an additional varying capacitor greatly increases the cost of the capacitive sensor element while also complicating the design of the sensor processing circuit.

SUMMARY OF THE INVENTION

An object of the present invention is to overcome the above-mentioned deficiencies of the prior art pressure transducers and provide an output signal which varies in a substantially linear manner as a function of sensed pressure over a large range of sensed pressures.

A more particular object of the present invention is to provide an improved capacitive pressure transducer which is less costly and has a relatively simple structure while providing an analog output signal having a magnitude which varies substantially linearly as a function of sensed pressure. A further object is to provide such a transducer which operates satisfactorily over a large range of temperature.

In one embodiment of the present invention, a linearized electronic pressure transducer is provided which comprises first means for effectively providing a first analog signal having a magnitude varying as a predetermined function of sensed pressure; non-linear circuit means coupled to said first means for providing an analog control signal having a magnitude varying as a predetermined non-linear function of said first analog signal magnitude; and output circuit means coupled to both said first means and said non-linear circuit means for receiving both said analog control signal and said first analog signal and providing an output signal having a magnitude varying as a substantially linear function of sensed pressure, said output circuit means utilizing said analog control signal magnitude to modify the magnitude variation provided by said first analog signal to produce said linearly varying output signal.

Preferably the electronic pressure transducer recited above is a capacitive pressure transducer wherein a capacitive sensor is utilized to provide a variable capacitance which varies in response to sensed pressure. Also preferably, the variable capacitance is utilized to provide said first analog signal by comparing an oscillator frequency determined by said variable capacitance with a reference frequency such that the magnitude of said first analog signal is related to the frequency difference between the reference frequency and the frequency determined by said variable capacitance. More significantly, the non-linear circuit means preferably comprises at least one diode which provides said non-linear variation of said analog control signal, and temperature compensating diodes are utilized such that a temperature compensated analog control signal which is non-linearly varying is produced. This temperature compensated non-linear analog control signal is then coupled as a gain control input to a variable gain amplifier circuit that receives said first analog signal as an input and provides as an output said output signal which therefore varies substantially linearly as a function of sensed pressure.

Through the use of the above recited structure, it has been found that a capacitive pressure transducer can be constructed which has an analog output signal magnitude that varies substantially linearly as a function of sensed pressure over extreme ranges of temperature and pressure. This has been accomplished by the use of a minimum number of circuit elements and at a relatively inexpensive cost. The above recited structure essentially implements the desired result by non-linearly varying the gain of an amplifier for the first analog signal as a function of sensed pressure.

BRIEF DESCRIPTION OF THE DRAWINGS

For a more complete understanding of the present invention reference should be made to the drawings, in which.

DESCRIPTION OF THE PREFERRED EMBODIMENT

Figure 1:
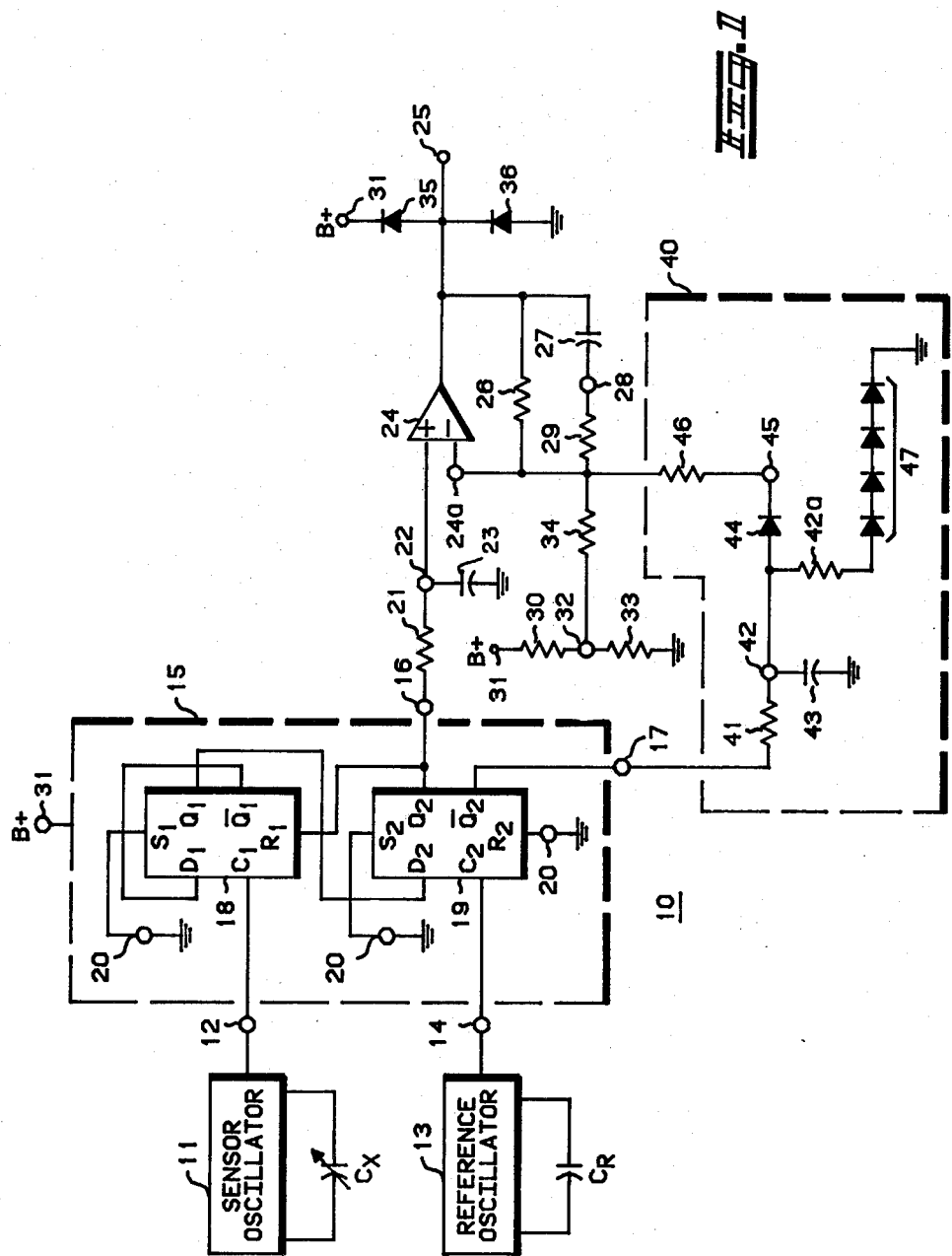
FIG. 1 is a schematic diagram of a capacitive pressure transducer constructed according to the teachings of the present invention.

FIG. 1 illustrates a linearized electronic capacitive pressure transducer 10 constructed in accordance with the teachings of the present invention. The transducer includes a sensor oscillator 11 which utilizes a frequency determining variable capacitance pressure sensor $C_x$ which provides a capacitance that varies in accordance with sensed pressure. The oscillator 11 provides at an output terminal 12 an output signal having a frequency which varies in response to the sensed pressure. The specifics of the sensor oscillator 11 have not been illustrated since many types of oscillator configurations can be utilized to provide an oscillator that produces an output frequency in accordance with the magnitude of a variable capacitance such as provided by the capacitor sensor $C_x$. The configuration of the pressure sensor $C_x$ can correspond to that shown in any one of the U.S. patents previously noted.

The transducer 10 also includes a reference oscillator 13, of any known configuration, which has its output frequency determined by a reference capacitor $C_r$. The reference oscillator 13 produces at a terminal 14 an output signal at a reference frequency determined by the capacitance of the capacitor $C_r$.

The signals at the terminals 12 and 14 are both coupled to an effective combining circuit 15 (shown dashed) which provides complimentary outputs at output terminals 16 and 17 wherein the signals at these terminals comprise variable duty cycle signals having their duty cycle related to the difference between the frequencies of the signals at the terminals 12 and 14. It should be noted that the signal at the terminal 16 will have its duty cycle varying directly as a function of the sensed pressure whereas the duty cycle of the signal at the terminal 17 will vary inversely as a function of the sensed pressure. Thus the signals at the terminals 16 and 17 are compliments of one another. If desired, the signal at the terminal 17 can be derived directly from the signal at the terminal 16 through the use of an inverter stage, but the specific configuration prefered for the combining circuit 15 permits the direct generation of the signal at the terminal 17.

Circuits similar to the combining circuit 15 are known to provide variable duty cycle signals wherein the duty cycle is related to the difference between two frequencies which are being compared. An example of such circuitry is shown in issued U.S. Pat. No. 4,250,452 to Gray and Pace and which is assigned to the same assignee as the present invention. In that patent, the variable duty cycle signal is integrated and the integrated signal is used as a closed loop control feedback signal so as to maintain the duty cycle at substantially fifty (50) percent whereby the magnitude of the feedback voltage is therefore related to the difference between the magnitude of a reference capacitor and the magnitude of a variable pressure sensing capacitor. Other similar circuits are known and one such circuit is embodied in an integrated circuit SCCF74116 available from Motorola, Inc., the assignee of the present invention. This IC is known to be used with circuits similar to the present invention to provide a variable duty cycle output voltage related to the frequency difference of two frequencies wherein one of these frequencies is related to a sensed pressure.

The effective combining circuit 15 comprises first and second D-type flip-flop circuits 18 and 19, respectively. A clock terminal $C_1$ of the flip-flop 18 is directly connected to the terminal 12 and a data terminal $D_1$ of the flip-flop 18 is directly connected to an inverted output terminal $\overline{Q_1}$ of the flip-flop. A set terminal $S_1$ of the flip-flop 18 is directly connected to a terminal 20 that is directly connected to ground. A clock terminal $C_2$ of the flip-flop 19 is directly connected to the terminal 14 and a data terminal $D_2$ of the flip-flop 19 receives its input signal from a non-inverting output terminal $Q_1$ of the flip-flop 18 via a direct connection. Set and reset terminals $S_2$ and $R_2$ of the flip-flop 19 are both directly connected to the ground terminal 20, and a non-inverting output terminal $Q_2$ of the flip-flop 19 is connected directly to a reset terminal $R_1$ of the flip-flop 18 and connected to the output terminal 16. An inverted output terminal $\overline{Q_2}$ of the flip-flop 19 is directly connected to the terminal 17.

With the above recited connections, the effective combining circuit 15 receives the signals at the terminals 12 and 14 and provides resultant complimentary variable duty cycle signals at the terminals 16 and 17 wherein the duty cycles of the signals at these terminals are related to the frequency difference between the signals at the terminals 12 and 14. The signals at the output terminals 16 and 17 vary in opposite senses as a function of the frequency difference between the signals at the terminals 12 and 14, and therefore vary as opposite functions of the sensed pressure. Preferably, the combining circuit 15 can comprise a single integrated circuit containing two D-type flip-flop circuits, and Motorola integrated circuit MC14013B can be utilized for the circuit 15.

The resultant variable duty cycle signal at the terminal 16 is coupled through a series resistor 21 to a terminal 22 that is coupled to ground through an integrating capacitor 23. The elements 21 and 23 form an integrating network which transforms the variable duty cycle signal at the terminal 16 into a first analog signal at the terminal 22 which has a magnitude that varies directly as a function of the capacitance of the pressure sensor $C_x$, and, therefore also as a direct function of the sensed pressure. The first analog signal at the terminal 22 is coupled to a non-inverting input terminal (+) of an operational amplifier 24 which has its output directly coupled to an output terminal 25 and coupled through a resistor 26 to an inverting input terminal 24a (−) of the amplifier 24. The output of the amplifier 24 is also coupled through a capacitor 27 to a terminal 28 that is coupled through a resistor 29 to the inverting input terminal 24a. The elements 26–29 determine the AC and DC gain of the operational amplifier 24 by virtue of negative feedback of the output of the amplifier. The resistor 26 primarily determines the gain of the amplifier 24. The resistor 29 and capacitor 27 are used to provide feedback to reduce ripple voltage variations at the output terminal 25.

Biasing circuitry is provided for the amplifier 24 by means of a resistor 30 coupled between a B+ terminal 32 and a terminal 32 which is coupled directly to ground through a resistor 33 and coupled through a resistor 34 to the terminal 24a. The elements 30–34 provide a DC bias voltage for the operational amplifier 24 at its inverting input terminal 24a. It should also be noted that the combining circuit 15 is also coupled to the B+ terminal 31 such that the flip-flop circuits 18 and 19 receive DC power via a connection to this terminal.

Signal amplitude limiting diodes 35 and 36 are utilized to limit the magnitude of the analog output signal provided at the terminal 25. The diode 35 has its anode directly connected to the terminal 25 and its cathode connected to the B+ terminal 31, whereas the diode 36 has its cathode directly connected to the terminal 25 and its anode coupled to ground. By the aforerecited connections, the diodes 35 and 36 limit the swing of the analog voltage at the terminal 25 to one diode drop above the magnitude of the B+ voltage at the terminal 31 and one diode drop below the magnitude of ground voltage.

The above described circuitry directly corresponds to a Motorola, Inc. capacitive pressure sensing transducer circuit model 6PB 2001 which was solid prior to the creation of the present invention. It was found that this circuitry, while operating satisfactorily over a relatively small range of sensed pressure when the magnitude of the analog voltage at the terminal 25 was allowed to vary to between ground and 9 volts, did not perform satisfactorily over a large range of sensed pressure when the magnitude of the voltage at the terminal 25 had to vary between the narrower voltage range of ground to five volts. To overcome this deficiency, the present invention was implemented which comprises the use of a non-linear element to provide linearization for the analog output signal at the terminal 25.

The present invention involves the addition of a non-linear circuit 40 (shown dashed) to the above recited circuit configurations shown in FIG. 1. The non-linear circuit 40 comprises a resistor 41 coupled between the terminal 17 and a terminal 42 which is directly connected to ground via an integrating capacitor 43. The terminal 42 is connected directly to the anode of a diode 44 which serves as a non-linear circuit element. The cathode of the diode 44 is connected to a terminal 45 that is connected through a resistor 46 to the inverting input terminal 24a of the amplifier 24. The anode of diode 44 is coupled to ground through a resistor 42a in series with a string of four cathode to anode connected series diodes 47 connected such that the anode of one of the diodes 47 is connected to the resistor 42a and the cathode of one of the diodes 47 is directly connected to ground.

Essentially, the elements 41 and 43 integrate the oppositely varying duty cycle signal at the terminal 17 and provide an analog control voltage at the terminal 42 which varies in an opposite sense, with respect to the voltage at the terminal 22, as a function of sensed pressure. The diode 44 utilizes this oppositely varying control signal effectively to provide a non-linear oppositely varying analog control signal at the terminal 45 due to the non-linear conduction characteristic of diode 44. The resistor 42a is used to set the turn off level of the diode 44 as a function of the signal at terminal 42. The non-linear control signal at the terminal 45 results in effectively changing the amount of signal feedback at the inverting input terminal 24a of the amplifier 25, and therefore this configuration implements an amplifier gain control for the amplifier 24 wherein the gain of the amplifier 25 is varied in accordance with the non-linear analog control signal at the terminal 45.

It should be noted that the opposite sense variation of the analog control voltage at terminal 42 is due to the use of the signal at terminal 17 which is created by inverter circuitry in the combining circuit 15, wherein this inverter circuitry comprises bring out the terminal $Q_2$ to terminal 17. The temperature compensating diodes 47 insure that the analog control voltage at the anode of the diode 44, which is the same as the voltage at terminal 42, and therefore also the non-linear control voltage at the terminal 45, will have a desired predetermined temperature variation characteristic such that the present invention will provide a desired amplifier gain variation not only as a function of the sensed pressure, but also as a function of temperature.

The operation of the non-linear circuit 40 can also be analyzed by considering the analog control voltage at the terminal 42 to cause the diode 44 to implement a non-linear resistance due to the biasing of the diode 44 by the control voltage and the non-linear resistance characteristic of the diode 44. This non-linear diode resistance therefore affects the amount of signal feedback via resistors 26 and 29 to the terminal 24a and therefore implements a non-linear control of the gain of the amplifier 24 as a function of sensed pressure. Regardless of which way the operation of the non-linear circuit 40 is analyzed, the end result is the non-linear control of the gain of the amplifier 24 by effectively providing a non-linearly varying analog gain control signal.

By selection of component values for the elements illustrated in FIG. 1, it was found that a substantial improvement to the linearity for the control voltage at the terminal 25 could be achieved over a large range of sensed pressure even when the voltage at the terminal 25 was only permitted to vary between ground and five volts. This can be illustrated by referring to the graphs in FIGS. 2 and 3.

Figure 2:
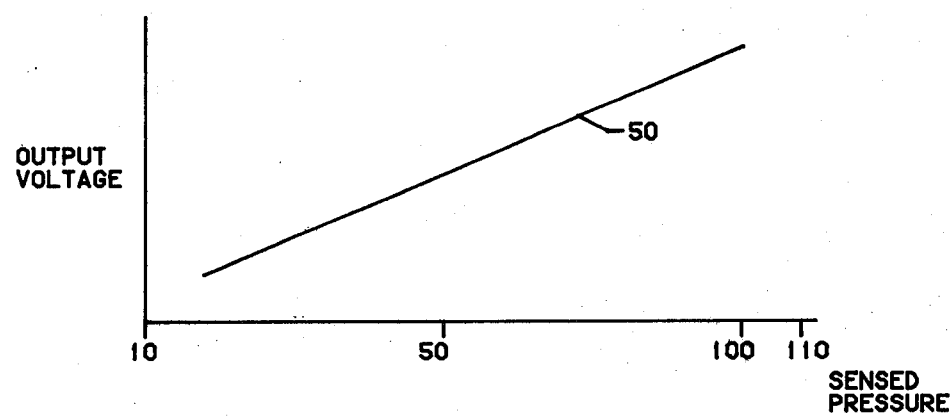
FIG. 2 is a graph illustrating a desired output voltage versus sensed pressure characteristic.

FIG. 2 illustrates a desired hypothetical linear transfer characteristic 50 for the capacitive pressure sensing transducer shown in FIG. 1. The vertical axis in FIG. 2 represents the magnitude of the analog output voltage at the terminal 25 while the horizontal axis represents the sensed pressure in kilopascals (KPa).

Figure 3:
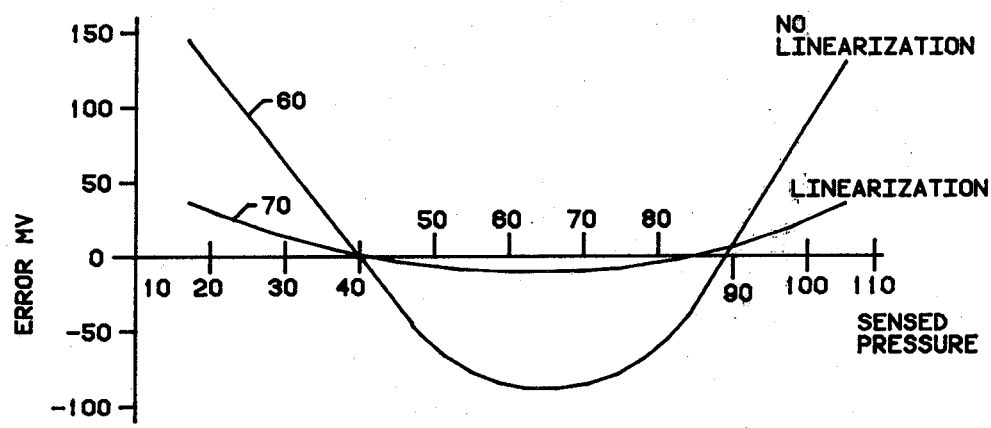
FIG. 3 is a graph illustrating the amount of variation from the desired characteristic shown in FIG. 2 achieved by the circuit in FIG. 1 with and without the use of a non-linear gain control circuit which is part of the present invention.

FIG. 3 shows two curves which illustrate the effectiveness of the non-linear circuit 40 in obtaining the desired linear transfer characteristic 50 shown in FIG. 2. In FIG. 3, the horizontal axis again represents the sensed pressure in kilopascals while the vertical axis now represents the error, in millivolts (mV), with respect to the actual voltage produced at the terminal 25 as compared with the theoretical voltage desired to be produced at the terminal 25 if the precise linear characteristic 50 were obtained. In other words, the graphs in FIG. 3 represent the deviation of the actual obtained result from the theoretical linear characteristic.

A first graph 60 shown in FIG. 3 illustrates the deviation from the theoretical linear characteristic 50 for the circuit in FIG. 1 without the use of the non-linear circuit 40. It should be noted that at a sensed pressure of 40 kilopascals the actual and theoretical linear variation coincide exactly, but that at other pressures a substantial deviation from the desired theoretical linear variation is apparent. It should be noted that in FIG. 3 the horizontal axis corresponds to zero derivation from the desired perfectly linear characteristic 50.

Through the utilization of the non-linear circuit 40, a substantially linear characteristic for the output analog signal at the terminal 25 is provided and this is represented by the curve 70 in FIG. 3. The improvement brought about by the non-linear circuit 40 is apparent by comparing the graphs 60 and 70 in FIG. 3. It should be noted that the curve 60 in FIG. 3 corresponds to the performance characteristic of the prior Motorola circuit which was utilized in the Motorola transducer module 6PB2001 which corresponds to the circuitry in FIG. 1 without the use of the non-linear circuit element 40.

Because the present invention utilizes a separate integrating network 41 and 43 for developing its gain control voltage, and because temperature compensation elements 47 are applied to this separate gain control voltage, designing the present invention for optimizing the linearization of the analog output voltage at the terminal 25 is possible. In addition, by selection of the magnitude of the resistors 42a and 46 and the characteristics of the diode 44, additional design flexibility for linearizing the characteristic at the terminal 25 is possible. All of this is accomplished without affecting the integration of the first analog signal at the terminal 22 that is directly related to the sensed pressure. An additional advantage of the present invention is that it implements a substantially linear characteristic for the analog output voltage at the terminal 25 through the use of a minimum of additional components as is apparent from the configuration shown in FIG. 1. This minimizes the cost of the capacitive transducer 10 of the present invention.

While I have shown and described specific embodiments of this invention, further modifications and improvements will occur to those skilled in the art. All such modifications which retain the basic underlying principles disclosed and claimed herein are within the scope of this invention.

I claim:

1. A linearized electronic pressure transducer operative over a range of temperature comprising:
   first means for providing a first analog signal having a magnitude varying as a predetermined function of sensed pressure;
   non-linear circuit means coupled to said first means for recieving a signal therefrom and in response thereto effectively providing an analog control signal having a magnitude varying as a predetermined non-linear function of said first analog signal magnitude;
   output circuit means coupled to both said first means and said non-linear circuit means for receiving both said analog control signal and said first analog signal and providing an ouput signal having a magnitude varying as a substantially linear function of sensed pressure, said output circuit means utilizing said control signal magnitude to modify the magnitude variation provided by said first analog signal to produce said linearly varying output signal; and
   temperature compensation means operatively coupled to said output circuit means for providing temperature compensation for said output signal and thereby providing a substantially linear variation of said output signal as a function of pressure over a range of temperature.

2. A linearized electronic pressure transducer according to claim 1 wherein said non-linear circuit means includes at least one diode for effectively providing said non-linearly varying analog control signal.

3. A linearized electronic pressure transducer according to claim 2 wherein said non-linear circuit means includes inverter circuitry such that the magnitude of said non-linear analog control signal varies in an opposite sense as a function of sensed pressure as compared to magnitude of said first analog signal.

4. A linearized electronic pressure transducer according to any one of claims 1, 2 or 3, wherein said output circuit means includes a controllable gain amplifier circuit which receives said first analog signal as an amplifier input signal and receives said analog control signal as a gain determining control signal, and wherein said amplifier circuit provides said linearized output signal as its output by implementing a non-linear variation of the gain of said amplifier circuit.

5. A linearized electronic pressure transducer according to claim 4 wherein said temperature compensating circuit means includes means for providing said non-linear analog control signal with a temperature compensated magnitude characteristic, said temperature compensated non-linear analog control signal being utilized to vary the gain of said controllable gain amplifier circuit.

6. A linearized electronic pressure transducer according to claim 4 wherein said first means includes a capacitive pressure sensor which provides a variable capacitance in accordance with sensed pressure, said variable capacitance being utilized to provide said first analog signal.

7. A linearized electronic pressure transducer according to claim 6 wherein said first means includes oscillator circuitry for utilizing said variable capacitance to determine a variable frequency of oscillation of said oscillator circuitry in accordance with sensed pressure, and wherein said variable frequency is received by comparison means which compares said variable frequency to a reference frequency to provide a resultant signal having a variable duty cycle related to the frequency difference between the variable frequency and reference frequency.

8. A linearized electronic pressure transducer according to claim 7 wherein said first means includes integrator means for receiving said resultant signal as an input and providing said first analog signal as its output.

9. A linearized electronic pressure transducer according to claim 8 wherein said non-linear circuit means includes an integrator circuit for receiving and integrating the inverse of said resultant signal.

10. A linearized electronic pressure transducer according to claim 9 wherein said first means includes a flip-flop circuit which provides said resultant signal and its inverse as complimentary output signals.

11. A linerized electronic pressure transducer operative over a range of temperature comprising:
   first means for providing a first analog signal having a magnitude varying as a predetermined function of sensed pressure;
   gain control circuit means coupled to said first means for receiving a signal thereform and in response thereto effectively providing an analog gain control signal having a magnitude varying as a predetermined function of said first analog signal magnitude;
   output circuit means coupled to both said first means and said gain control circuit means for receiving both said analog control signal and said first analog signal and providing an output signal having a magnitude varying as a substantially linear function of sensed pressure, said output circuit means utilizing said control signal magnitude to modify the magnitude variation provided by said first analog signal to produce said linearly varying output signal, said output circuit means including a controllable gain amplifier circuit for receiving said first analog signal as an amplifier input signal and receiving said analog gain control signal and implementing a non-linear variation of the gain of said amplifier circuit in response to said analog gain control signal; and
   temperature compensation means operatively coupled to said output circuit means for providing temperature compensation for said output signal and thereby providing a substantially linear variation of said output signal as a function of pressure over a range of temperature.

12. A linearized electronic pressure transducer according to claim 11 wherein said temperature compensation means comprises means for providing the magnitude variation of said analog gain control signal with a predetermined variation as a function of temperature, thereby providing a substantially linear variation of said output signal as a function of pressure over a range of temperatures.

* * * * *